Jan. 24, 1967   W. S. STERLING   3,300,022
CLOSURE HANDLING APPARATUS
Filed Jan. 7, 1965   7 Sheets-Sheet 1

INVENTOR.
Walter S. Sterling
BY Robert R. Churchill
ATTORNEY

INVENTOR.
Walter S. Sterling
BY Robert P. Churchill

ATTORNEY

INVENTOR.
Walter S. Sterling
BY Robert R. Churchill
ATTORNEY

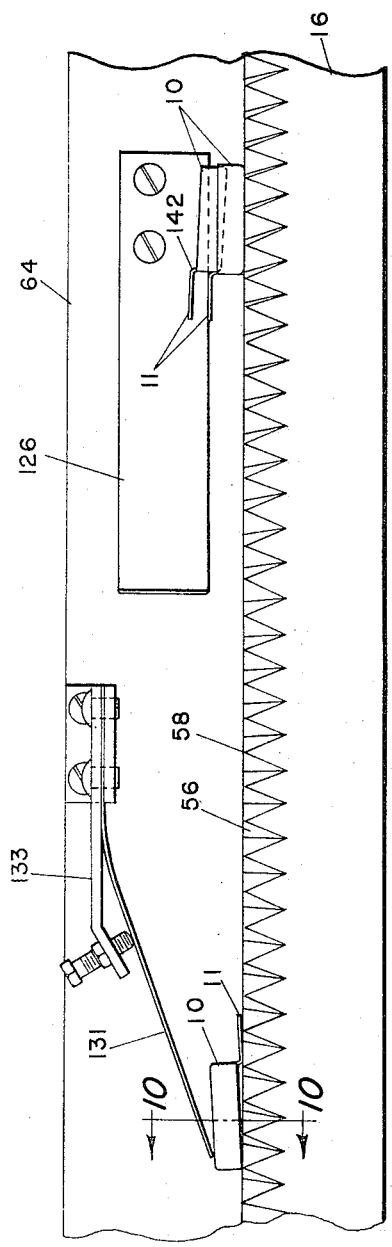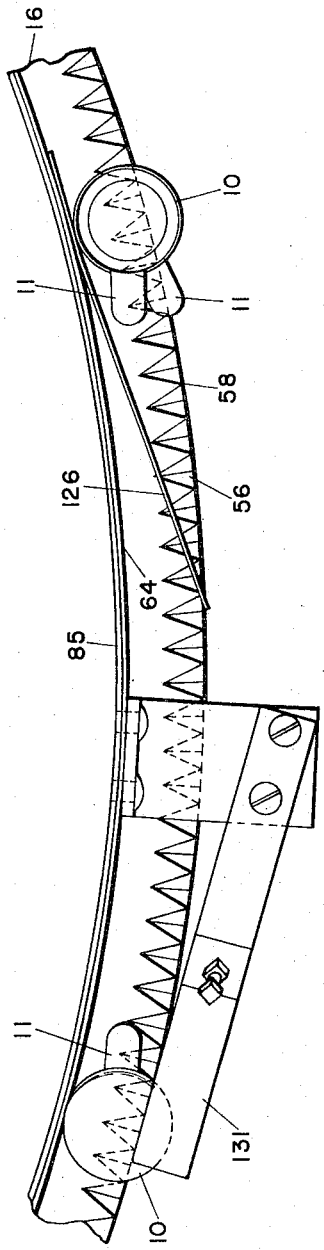

Jan. 24, 1967　　　W. S. STERLING　　　3,300,022
CLOSURE HANDLING APPARATUS
Filed Jan. 7, 1965　　　　　　　　　　　　　　7 Sheets-Sheet 5
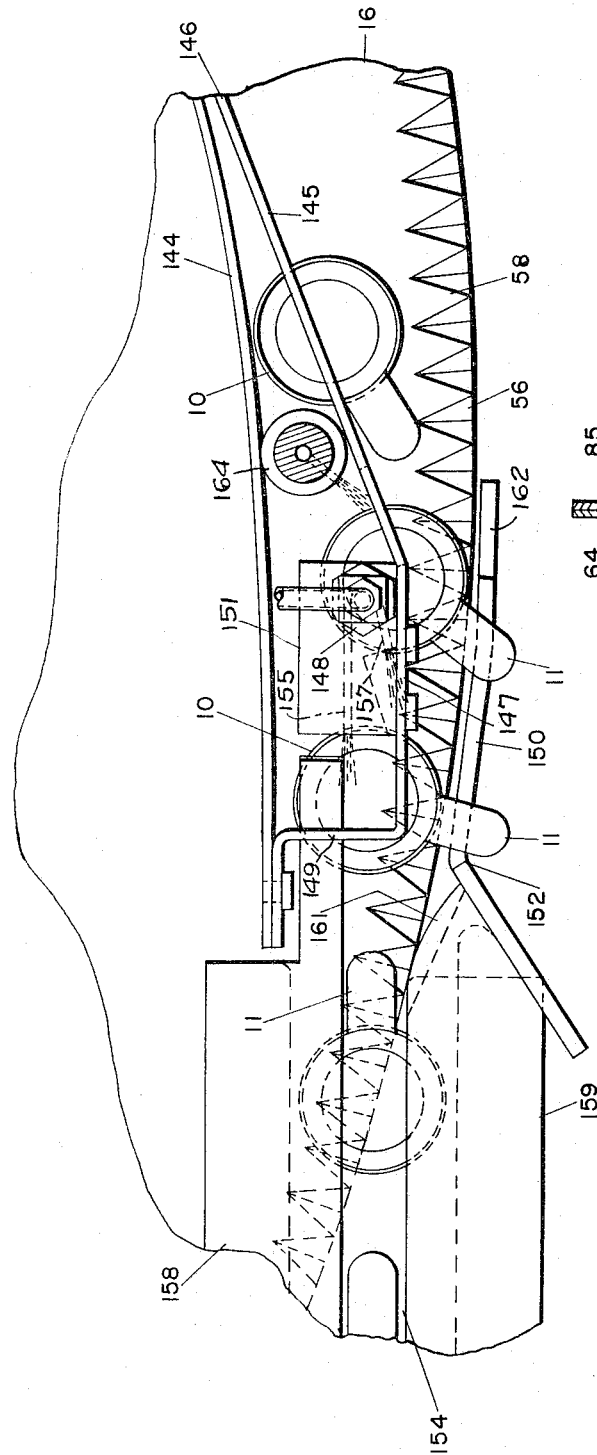
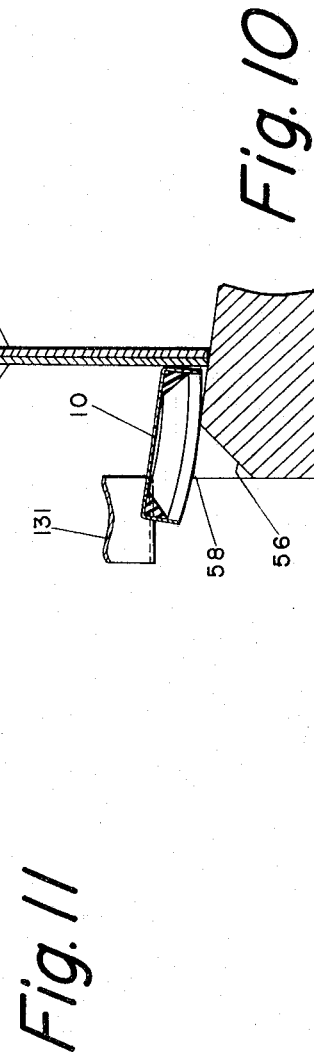
INVENTOR.
Walter S. Sterling
BY Robert L. Churchill
ATTORNEY

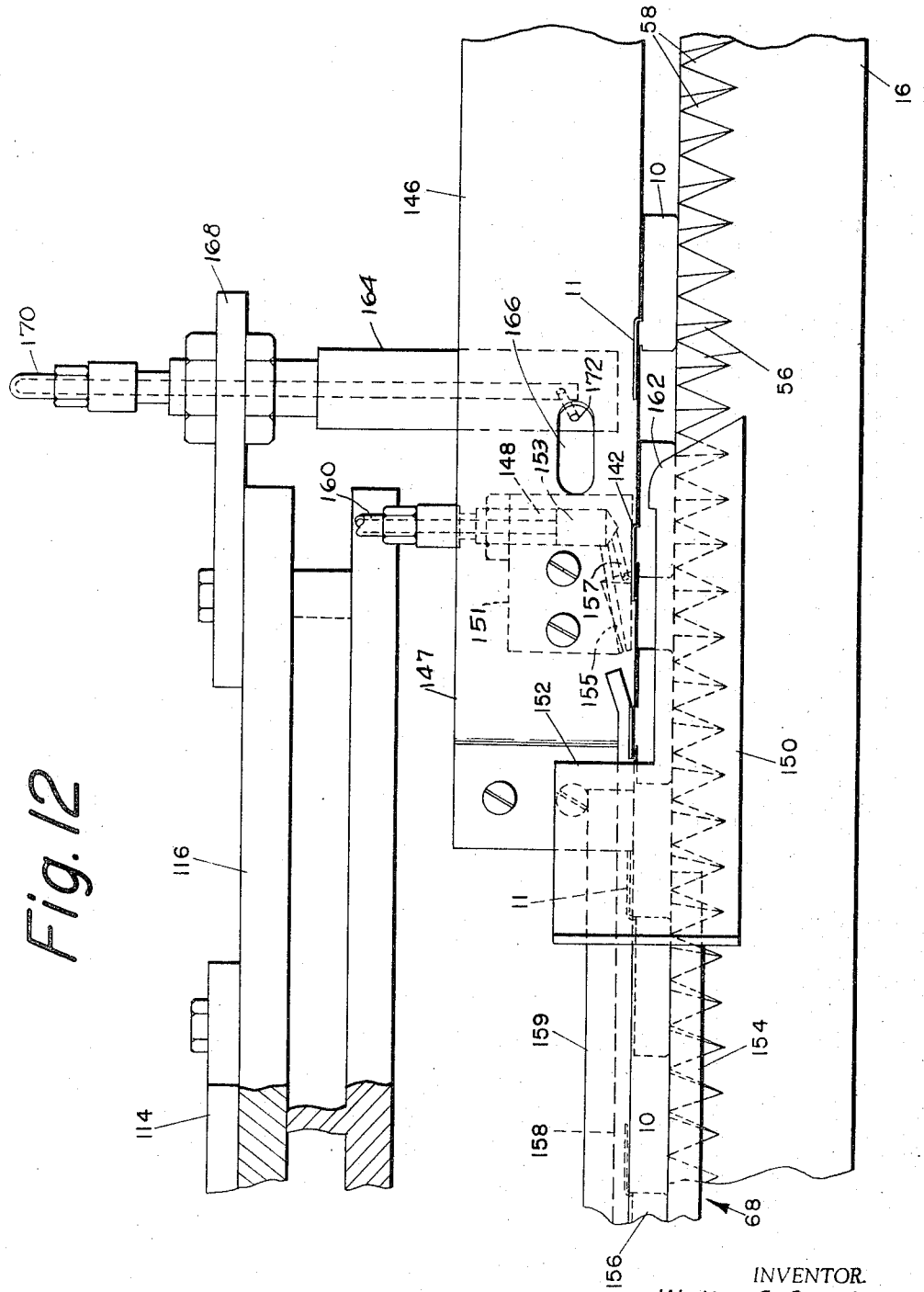

Jan. 24, 1967  W. S. STERLING  3,300,022
CLOSURE HANDLING APPARATUS
Filed Jan. 7, 1965

INVENTOR.
Walter S. Sterling
BY Robert X. Churchill
ATTORNEY

United States Patent Office 3,300,022
Patented Jan. 24, 1967

3,300,022
CLOSURE HANDLING APPARATUS
Walter S. Sterling, Quincy, Mass., assignor to Pneumatic Scale Corporation, Limited, Quincy, Mass., a corporation of Massachusetts
Filed Jan. 7, 1965, Ser. No. 423,911
20 Claims. (Cl. 198—33)

This invention relates to closure handling apparatus.

The invention has for an object to provide novel and improved closure handling apparatus adapted to receive randomly arranged closures or like articles from a supply thereof and to advance those closure assuming an oriented position into a supply chute for delivery to a closure applying machine or other instrumentality in a gentle and efficient manner.

The invention has for another object to provide novel and improved closure handling apparatus adapted for handling closures or like hollow articles open at one end and which is arranged to reject all those closures delivered to the apparatus in other than an open end up position.

The invention has for a further object to provide novel and improved apparatus of the character specified particularly adapted for handling closures or like hollow articles open at one end and having a laterally or radially extended tab, those closures assuming an open end up position being guided into a chute with the tabs directed rearwardly, and those closures assuming a closed end up position being rejected.

Another object of the invention is to provide novel and improved apparatus of the character described having novel control means for discontinuing the advance of closures to the supply chute when the chute is filled to a predetermined height while permitting continuous operation of the closure handling apparatus.

With these general objects in view and such others as may hereinafter appear, the invention consists in the closure handling apparatus and in the various structures, arrangements and combinations of parts hereinafter described and particularly defined in the claims at the end of this specification.

In the drawings illustrating the preferred embodiment of the invention:

FIG. 8 is a plan view detail of closure engaging elements for rejecting incorrectly presented closures as will be described;

FIG. 9 is a front elevation of the same;

FIG. 10 is a cross sectional view taken on the line 10—10 of FIG. 9;

FIG. 11 is a plan view detail of a tab orienting device to be described, portions thereof being shown in cross section;

FIG. 12 is a side elevation of the same;

Figure 1:
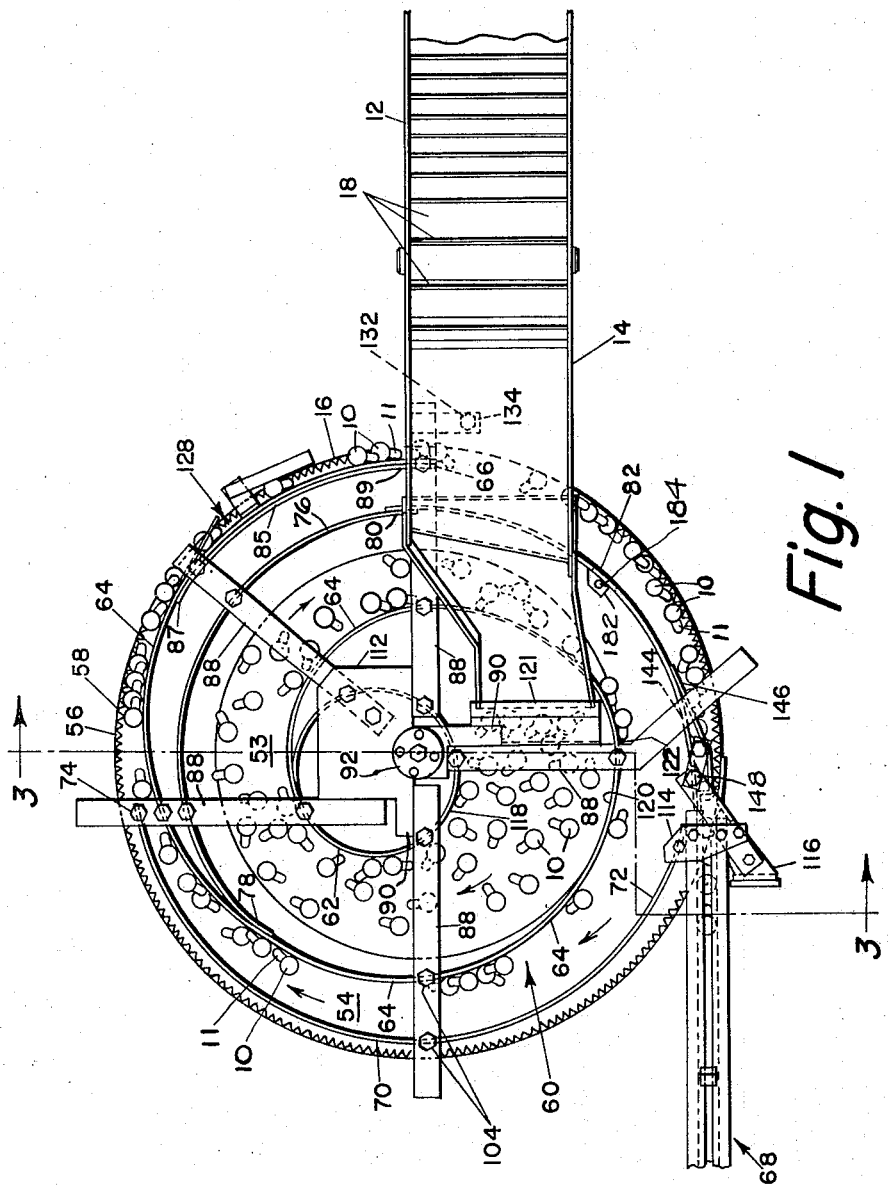
FIG. 1 is a plan view of closure handling apparatus embodying the present invention.

In general, the present invention contemplates closure handling apparatus for use in connection with the feeding mechanism of a closure applying machine or the like wherein it is desired to deliver the closures in a line and oriented in a desired position for application to successive containers. In the illustrated embodiment of the invention the closures are delivered onto a rotary carrier disk from a supply thereof in any usual or preferred manner, peferably in controlled amounts, and are guided outwardly to extend partially over the edge of the rotary disk. The disk is serrated along its marginal edge to provide spaced lands so that those closures which initially assume an open end up position are supported by the disk to be advanced and deposited into the upper end of a feed chute in an oriented position. However, those closures which initially assume a closed end up position are caused to drop down over the lands to be rejected.

The present closure handling apparatus is particularly adapted for handling relatively lightweight closures having laterally extended tabs thereon for use in removing the closure from the container, and provision is made for guiding the tabs to extend in a rearward direction prior to entering the feed chute, the tabs being maintained in this condition during their advance in the chute. However, it will be understood that the present invention is not intended to be limited to apparatus for handling lightweight closures or to apparatus for handling closures provided with tabs since the present apparatus may be used with equal advantage for handling relatively heavy closures or conventional closures without tabs.

The present closure handling machine is also characterized by structure capable of handling the closures in a smooth and gentle manner with minimum liability of jamming or breakage of the closures, and with minimum liability of scratching or marring the finish of the closure during their progress through the machine. In practice, the present closure handling machine is operated at a relatively slow rate of speed while being capable of advancing a relatively great number of oriented closures in a short interval of time, sufficient to maintain an adequate supply of oriented closures in the delivery chute leading to the closure applying or other machine which may be operated at a relatively high rate of speed. In the illustrated embodiment of the invention the carrier is rotated about 21 r.p.m. which is sufficient to provide 600 oriented closures a minute. The present closure handling apparatus is also capable of handling a relatively wide range of sizes and shapes of closures with a minimum amount of adjustment to suit the closures to be run.

Another important feature of the present invention resides in the provision of control means for permitting continuous operation of the machine when the chute for receiving the closures is filled to a predetermined point. Prior to the present invention it has been the practice to stop the closure handling apparatus when the chute was filled up to a predetermined point so as to discontinue the advance of closures into the chute. In accordance with the present invention provision is made for rejecting the closures from the orienting mechanism prior to entering the chute in response to detection of a filled chute while permitting continuous operation of the machine. On advantage of this expedient is that the closures on the carrier in the process of being oriented are not subject to being displaced by stopping and starting of the carrier whereby a smooth and continuous flow of oriented closures may be maintained in readiness to be advanced into the chute when a sufficient number of closures have been withdrawn from the chute so as to again receive closures. Another advantage of this expedient is that the shock incident to starting and stopping the machine is eliminated, thus reducing wear of the parts and increasing the life of the machine.

Referring now to the drawings, the closures 10, herein illustrated as provided with laterally extended opening tabs 11, are delivered to the apparatus from a bulk supply thereof by a conveyor indicated generally at 12 onto an inclined receiving chute 14 which delivers the closures onto a rotary carrier disk 16. The closures 10 are released onto the chute 14 as they travel over the upper end of the conveyer 12, as illustrated, and are preferably delivered in controlled amounts as withdrawn from the supply by spaced carrier bars 18 attached to the conveyer. In practice it has been found that a majority of randomly arranged hollow closures deposited onto the horizontal surface of the carrier inherently tend to assume an oriented position, that is, with their open ends up since the weight at the closed end of the closure will tend to cause the same to fall in the direction of the closed end.

As illustrated herein, the rotary carrier disk 16 is supported for rotation about a central supporting post or hollow column 20 attached to a suitable base, not shown. The depending hub 22 of the disk 16 is provided with a sleeve 24 secured to the hub by bolts 26. The sleeve is provided with ball bearings 28, 30, the lower bearing 30 resting on a shouldered portion of the central post 20. A lock washer 32 and nut 34 threadedly engaged with the post 20 engage the upper ball bearing 28 as shown. The carrier disk 16 is arranged to be rotated through connections from a motor 36 belted to the input shaft 38 of a speed reducing unit 40. The output shaft 42 of the speed reducing unit is provided with a pinion 44 which is in mesh with a gear 46 connected to the lower end of the sleeve 24 by the bolts 26. The motor 36 and speed reducing unit 40 are attached to the underside of a mounting plate 48 supported on the post by a flanged hub 50. A casing 52 mounted on top of the plate 48 encloses the gearing.

Figure 5:
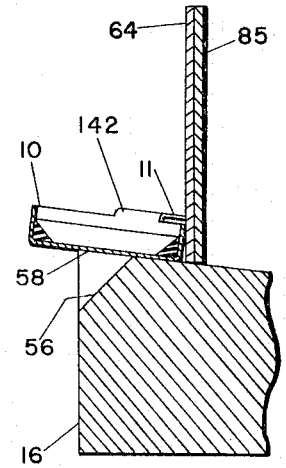
FIG. 5 is a cross sectional view of the same as taken on the line 5—5 of FIG. 4.
Figure 6:
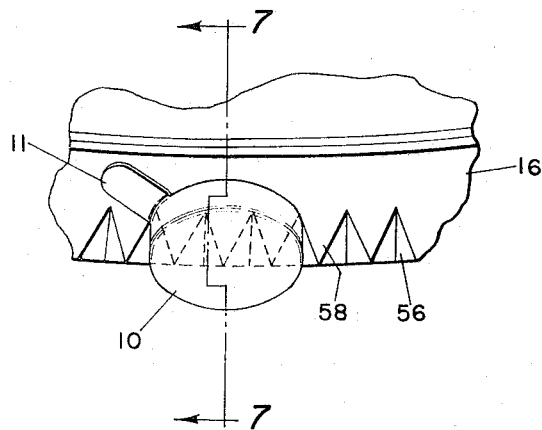
FIG. 6 is a view similar to FIG. 4 showing a closure with its open end down in an unbalanced position and about to be rejected from the disk.
Figure 7:
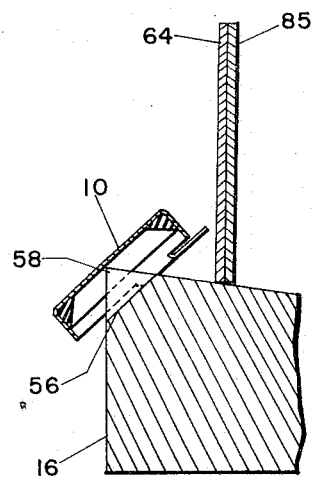
FIG. 7 is a cross sectional view of the same as taken on the line 7—7 of FIG. 5.

As herein shown, the upper face of the rotary carrier disk 16 is generally dish-shaped or concave having a relatively flat inner surface as indicated at 53 and having a slightly upwardly inclined annular surface as it approaches the periphery or edge of the disk as indicated at 54. The outer edge of the disk 16 is provided with notches or recesses in the form of serrations 56 cut at an angle of about 45° to the periphery of the disk and providing spaced lands 58 between which an open end up closure guided to and partially beyond such edge may be supported, as shown in FIG. 5, and over which an open end down closure, as shown in FIG. 7, will be caused to drop to overbalance the closure and reject the same from the disk.

Provision is made for guiding the randomly arranged closures deposited on the flat portion 53 of the rotary disk progressively outwardly and upwardly along the relatively small inclined annular surface 54 toward the outer edge of the disk as the same is rotated to present the closures into a position in which a portion of the closure extends beyond the edge of the disk. In the illustrated embodiment of the invention the annular surface 54 is inclined at an angle of about 7° relative to the flat surface 53. As herein shown, the guide means may take the form of a spiral rail indicated generally at 60 and which includes a circular rail portion 62 adjacent to but offset from the center of the disk, and a spiral rail portion 64 extending tangentially from the circular portion and gradually moving outwardly away from the circle toward the edge of the disk and terminating at a point 66 spaced about 90° from the entrance to a feed chute indicated generally at 68. As herein shown, the feed chute 68 is arranged substantially tangentially with respect to the carrier disk 16.

An outer curved rail 70, which serves as a guard rail, extends through a substantially semicircular path adjacent the outer edge of the carrier disk 16 from a point 72 adjacent the feed chute 68 to a point 74. An inner curved guard rail 76 extends from a point 78 on the inner face of the spiral rail 64 to a point 80 adjacent to but spaced from the terminating point 66 of the spiral rail. A curved guide rail 82 extends from the point 80 to a point 84 adjacent the feed chute as illustrated. A reinforcing rail 85 extends along the inner face of the rail 64 from a point 87 to a point 89 adjacent the point 66.

The various guide rails above described are arranged to be supported above the rotary disk 16 by radially extended angle brackets 88 connected to the arms 90 of a spider 92 attached to the upper end of the stationary central post 20. The hub 94 of the spider 92 is keyed to the post 20 and is attached to the upper end of the post by a bolt 96 which extends through a cap member 98 and is threadedly engaged with a plug 100 secured in the upper end of the hollow post. The cap member 98 is connected to the hub by screws 102.

Each radially extended angle bracket 88 is provided with a plurality of adapters 104, each adapter having a threaded portion 106 extended through its angle bracket and adjustably supported therein by nuts 108. The lower end of each adapter 104 is provided with a slot 110 into which the upper edge portion of a guide bar is secured as illusrtated. One of the radially extended angle brackets 88 is secured to a plate 112 attached to adjacent arms 90 of the spider 92. Also, one end of the curved rail 70 is supported by a plate 114 secured to a bracket 116 disposed above the entrance to the feed chute 68.

Figure 2:
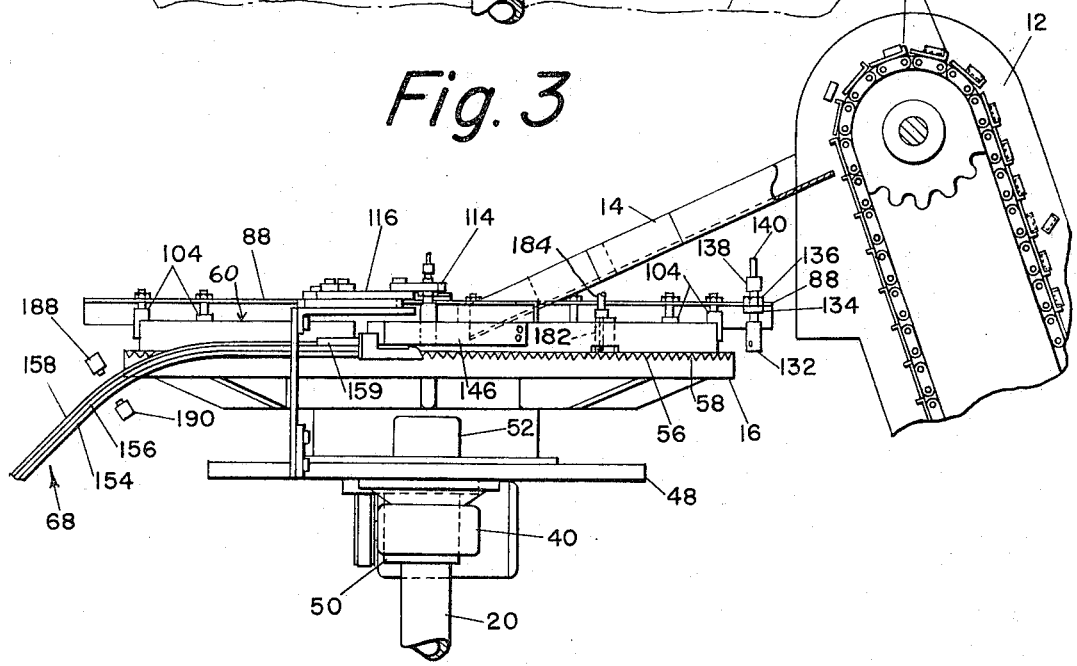
FIG. 2 is a side elevation of the apparatus shown in FIG. 1.
Figure 4:
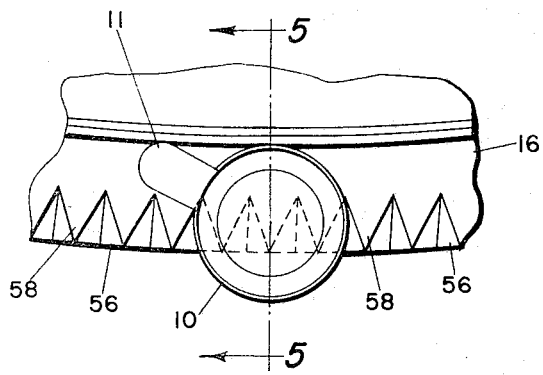
FIG. 4 is a plan view detail of an open end up closure retained in a balanced position on the edge of a rotary carrier disk.

From the description thus far it will be seen that the spirally arranged guide rails may be adjusted vertically relative to the upper surface of the rotary disk 16 to conform to the contour of the generally concave surface, the lower edges of the rails being spaced relatively close to such surface to provide guides engaged by the closures as they are carried around by the rotary disk. As illustrated in FIGS. 1 and 2, the lower end of the closure receiving chute 14 terminates a short distance above the carrier disk and is arranged to deposit the closures on the disk at a point adjacent the center thereof between the outer side wall 118 of the circular portion 62 of the guide rail and the inner side wall 120 of the spiral portion 64 of the guide rail. A plate 121 supported above the disk adjacent the lower end of the receiving chute serves to prevent the closures from bouncing out of position when they strike the disk.

The mass of closures thus desposited on the rotary carrier disk in randomly arranged positions, but with the majority in their open end up position as described, are carried around on the disk between the convolutions of the spiral rail in the direction of the arrows as shown in FIG. 1. During their travel between the convolutions on the flat surface 53 of the carrier disk 16 closures are urged outwardly by the gradually increasing outward curvature of the spiral guide rail, and when they arrive at a point indicated at 122, where the guide rail 64 passes over or intersects the inside diameter of the inclined annular surface 54 of the disk, the closures in engagement with the outer wall of the rail are carried progressively upwardly and outwarlly toward the peripheral edge of the rotary disk.

In practice, the closures are preferably delivered to the carrier disk 16 in controlled amounts commensurate with the withdrawal rate of the closures from the feed chute 68. In operation, the closures deposited between the convolutions adjacent the center of the disk will be more or less spread out at different distances from the center of the disk, and as the closures are carried around on the disk, those closest to the spiral wall will be first engaged by the gradually increasing curve of the rail, and those closures spaced from the rail at intermediate distances will be progressively engaged by the spiral rail to spread out and align the closures one behind the other in a single line against the outer wall of the spiral guide rail.

Referring now to FIGS. 8 and 9, in the event that one closure is riding on top of another in nested relation or ortherwise as the closures approach the edge of the disk, provision is made for rejecting such closures. As herein shown, this may be accomplished by a stationary bar 126 secured to the spiral rail 64 which may be arranged in the path of the closures at a height such as to permit passage of a single closure only under the bar. The bar 126 is preferably arranged at an angle extended diagonally across the path of the uppermost closure so that both closures will be rejected from the disk.

It will be seen that when the edge of a cylindrical closure carried by the disk engages the side wall of the spiral guide rail 64, the frictional resistance against the stationary rail will cause the closures to rotate as they are carried toward the edge of the carrier disk. In the illustrated embodiment of the invention wherein the closures are rotated in a clockwise direction, the tabs 11 of the closures disposed with their open ends up will be rotated into engagement with the rail in a forwardly extended position, as shown, which will terminate rotation of the closures. The closures thus advanced with their tabs extended in a forward direction in sliding engagement with the rail are carried to a position where the spiral guide rail is spaced a short distance from the periphery of the carrier disk as indicated at 128 to present the closure with a portion thereof extended beyond the edge of the disk and over the serrated edge portion 56, 58 as illustrated. As a result, those closures which are disposed in a desired or oriented position with their open ends up will be supported on such edge by the closed end of the closure resting on the spaced lands 58 of the serrated edge as illustrated in FIG. 5. It will be observed that the expedient of directing the tab portions 11 in a forwardly extending direction, as described, eliminates any adverse effect of the weight of such tab in upsetting the balance of the closure disposed on the edge of the disk. On the other hand, if the closure is advanced to and beyond the edge of the serrated periphery of the disk in an open end down position, the rim of the closure will drop down over the spaced lands with portions of the rim extending down into adjacent serrations 56. As a result, such closure will be overbalanced and will slide off the edge of the disk, as shown in FIG. 7, to be rejected from the apparatus. The rejected closures may fall into a hopper indicated generally at 130 to deliver the same into a container. The closures may be subsequently emptied into the supply to be again run through the apparatus.

In some instances it may be possible for an incorrectly oriented tab closure with its open end down to become balanced on the edge of the disk across the lands in the position shown in FIGS. 8 and 9 wherein the tab rests on one land and the lower edge of the rim of the closure rests on another land. Since the tab is offset from the rim, a closure thus positioned will cause the overall height to be greater than a correctly positioned closure. As shown in FIGS. 8, 9 and 10, a leaf spring 131 adjustably secured to a bracket 133 attached to the rail is arranged in the path of the high point of such incorrectly presented tab closure to provide a slight downward pressure to unbalance the closure and thus effect rejection thereof.

The oriented closures which maintain their balance on the lands 58 of the serrated edge 56 are advanced along the edge of the carrier disk 16 in engagement with the spiral guide rail 64 until they pass beyond the terminating point 66 thereof. The oriented closures now free of the spiral rail may remain in a balanced position along the edge of the disk straddled between the lands 58 of the serrations. However, in order to prevent inadvertent overbalancing of the oriented closures from the edge and to dispose the closures in a better position to be guided into the feed chute 68, the closures are preferably moved inwardly from the edge after leaving the end 66 of the spiral guide. This way be expediently accomplished, particularly with lightweight closures, by a small stream of air directed inwardly into the open end of the closure.

Figure 13:
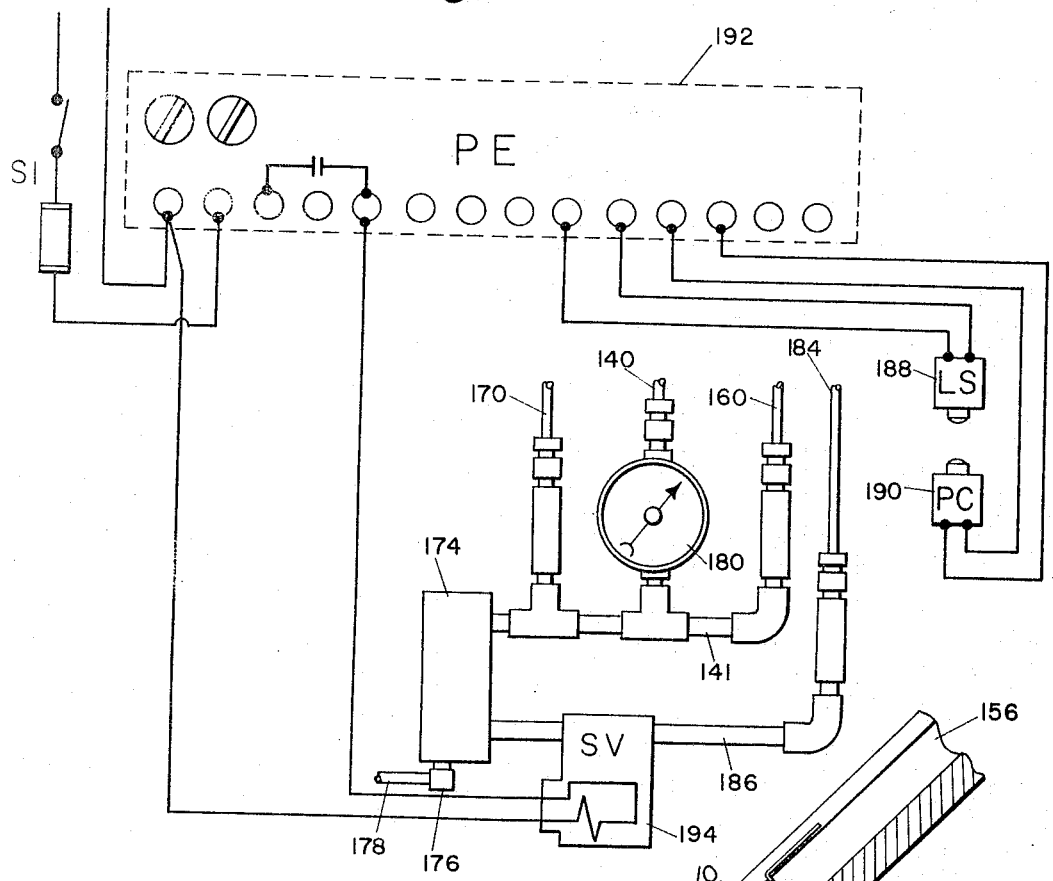
FIG. 13 is a diagrammatic view of a portion of a compressed air circuit to be described.

As herein shown, an air jet 132 is supported by a plate 134 attached to the outer end of an angle bracket 88 adjacent the termination 66 of the spiral guide 64. The jet 132 is provided with a threaded portion and may be adjustably supported in the plate 134 by a nut 136. The upper end of the jet may be provided with an adapter 138 connected by an air pipe 140 to a manifold unit 141 forming a part of an air circuit connected to a regulated source of compressed air as indicated in FIG. 13. The oriented closures thus moved inwardly from the edge of the carrier disk may assume a position on the inclined surface 54 intermediate the edge of the disk and the guide rail 82 as shown.

It will be observed that when the closures are advanced beyond the end 66 of the spiral rail they are no longer subject to rotation by contact therewith, and after the closures are moved inwardly from the edge of the disk by the air stream, the tabs 11 of the closures may extend in different directions. In the illustrated embodiment of the invention it is desired to present the closures into the chute 68 with the tabs 11 extended in a trailing or rearward direction. Accordingly, provision is made for guiding the closures to direct the tabs in a trailing direction during their advance toward the mouth of the chute and prior to entering the chute. It will be seen that the tabs are offset upwardly a short distance from the plane of the open end of the closure, the tab having a relatively short vertical portion 142 connecting it to the rim of the closure.

Figure 3:
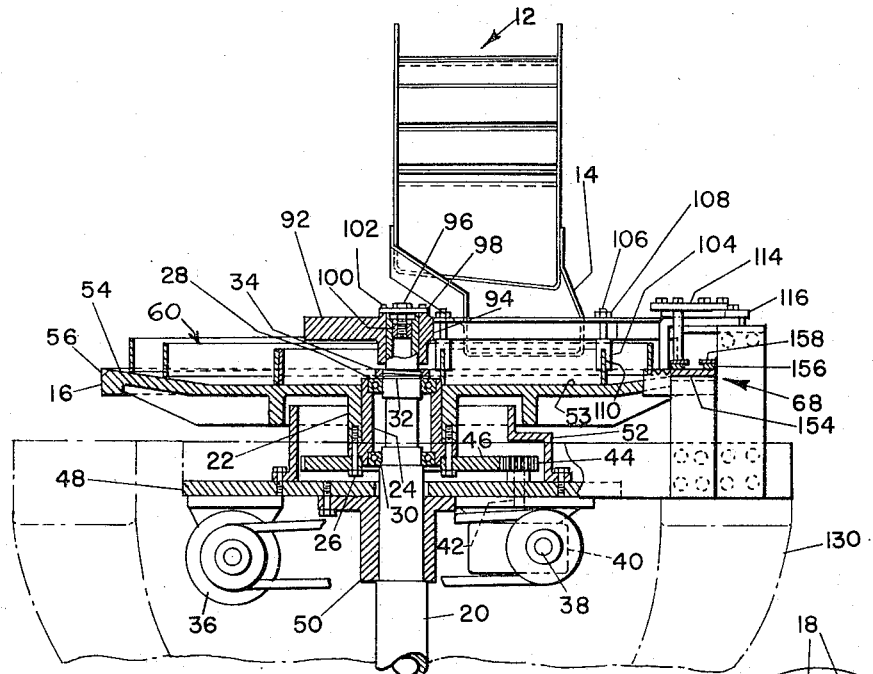
FIG. 3 is a cross sectional view taken on the line 3—3 of FIG. 1.
Figure 14:
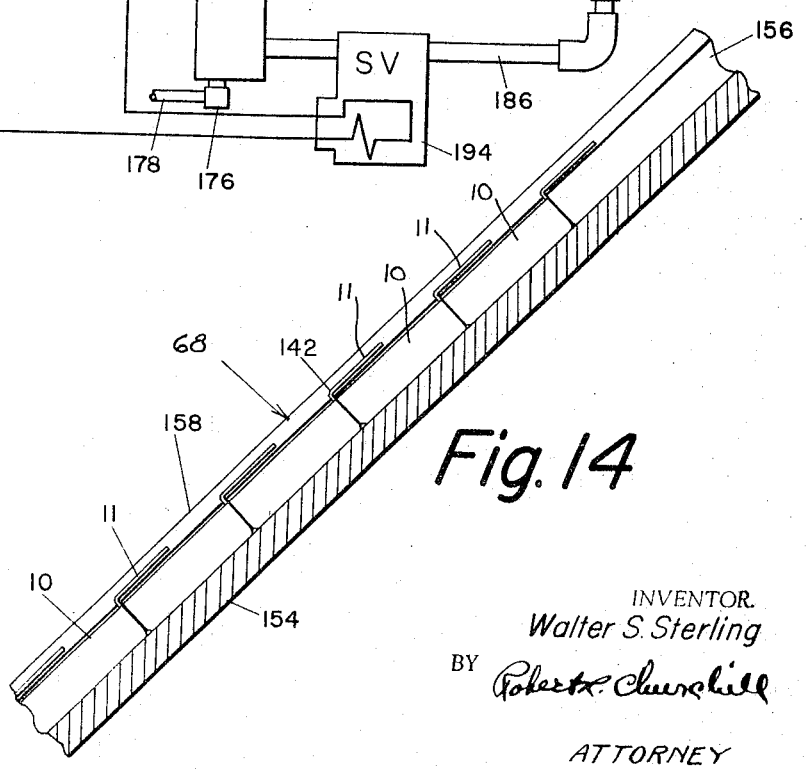
FIG. 14 is a detail view in cross section of the oriented closures in the feed chute.

As herein shown, see FIG. 11, an extension 144 of the guide rail 82 terminates at a point adjacent the mouth of the chute 68. Connected to the extension 144 is a rail 146 which has a portion 145 extending diagonally across the path of the closures, a straight portion 147 and a right angle portion 149 connected to the extension 144. The bottom edge of the rail 146 is spaced from the surface of the disk a distance such as to admit the height of the body portion of an open end up closure but will not admit the upwardly offset tab portion 11 as shown in FIG. 12. As a result, when the body of the closure passes under the rail 146, the vertical portion 142 of the tab will engage and slide along the outer face of the rail to guide the tab into an outwardly extended direction toward the edge of the disk. In order to overcome the frictional resistance of the portion 142 in contact with the rail 146 and also to rapidly advance the closure into the mouth of the chute, an air jet 148 is provided adjacent the rail as shown. The jet 148 is extended into a block 151 attached to the inner face of the stright portion 147 of the rail 146. The lower end of the jet communicates with a chamber 153 in the block which is provided with two spaced angularly directed jet openings 155, 157. The upper end of the jet 148 is provided with an adapter connected by an air pipe 160 which leads to the manifold 141 as indicated in FIG. 13. The inclined jet openings 155, 157 are arranged to direct streams of air into the open ends and against the outer walls of the closures after they have passed under the rail 146. The rapid advance of the closure at this point also serves to separate the same from an adjacent succeeding closure and to transfer the closure from the moving carrier into the stationary chute. As the closures are advanced toward the mouth of the chute with their tabs directed generally outwardly at various angles, the tabs 11 engage an outer rail 150 having a vertically extended edge 152 against which the tab engages to be turned in a trailing direction as the closure is advanced into the mouth of the chute. As illustrated in FIG. 3, the feed chute 68 may comprise a base plate 154, side rails 156 connected to the base plate and between which the body of the closure is guided as it rides on the base plate, and opposed top guides 158 connected to the side rails 156. The top guides 158 extend over the body of the closure and are spaced apart a distance such as to admit the width of the rearwardly extended tab 11 and to prvide a guideway to maintain the tabs in their rearwardly extended position during their advance down the chute. A separate guide piece 159 at the mouth of the chute has a curved end portion 161 to maintain the tabs in a rearward direction and to guide the same between the top guides 158. It will be seen that with this arrangement the body portion of a succeeding closure deposited in the chute will be enabled to slide under the tab portion of the preceding closure to provide a supply of tab closures in the chute with the body portions in contiguous engagement and with the tab portions oriented in a trailing direction as illustrated in detail in FIG. 14. The purpose of thus orienting the tabs to extend over the body portion of a succeeding closure is to prevent entanglement of the tabs one with the other and consequent jamming of the closures in the chute.

In the event that a closure is advanced to a point adjacent the rail 146 in a position other than an oriented position such that the body portion of the closure will not pass under the rail, such closure will be guided outwardly by the diagonal portion 145 of the rail where it will ride up on the curved end 162 of an extended portion of the outer rail 150. This will lift the improperly positioned closure up into the path of a stream of air from an air jet 164 disposed behind the rail 146, the rail having an opening 166 through which the air may pass. Thus, in operation, the improperly positioned closure will be blown off the edge of the carrier disk to be rejected into the hopper 30. As shown in FIG. 12, the jet 164 is adjustably supported in a bar 168 attached to the supporting frame 116, the upper end of the jet being connected by an air pipe 170 which also leads to the manifold unit 141 shown in FIG. 13. As illustrated in FIG. 12, the jet orifice 172 is slightly inclined and is positioned at a height such that the air stream will blow only against improperly positioned closures which are raised up by the curved end 162 of the outer rail 150, those closures which are properly positioned and which pass under the rail 146 being disposed below the path of the air stream.

It will be seen that the air jet 164 is capable of rejecting improperly positioned closures which are presented in a balanced position on the lands with their open ends down or which are presented in nested pairs with their open ends up or down, since neither of such non-oriented closures will pass under the rail 146. Thus, the jet 164 may comprise an auxiliary rejecting means to take care of such unoriented closures which may get by the rejecting elements 126 and 131 previously described. Furthermore, in a modified form of the invention, the rejecting elements 126, 131 may be eliminated whereby the lifting rail 150, 162 and the air jet 164 may comprise the sole means for rejecting such improperly positioned closures which have maintained their balance on the lands and have failed to be rejected over the serrated edge of the carrier disk during their travel along the edge of the disk.

As illustrated in FIG. 13, the manifold 141 is connected to an air block 174 which is provided with an inlet 176 connected by a pipe 178 to any usual or preferred regulated source of compressed air. The manifold pipe connections 140, 160 and 170 which lead to the air jets 132, 148 and 164, respectively, are continuously supplied with compressed air during the operation of the machine, the pipe connection 140 to the air jet 132 being provided with an auxiliary regulator 180 to permit further adjustment of the air pressure required for urging the oriented closures inwardly from the edge of the disk.

From the above description it will be seen that the present apparatus is adapted to handle closures provided with laterally extended tabs in a manner such as to reject those closures which are delivered to the apparatus in other than an open end up position and to deposit the open end up closures into the feed chute 68 with their tabs 11 oriented in a trailing direction. Since a majority of the closures delivered to the carrier disk are oriented in the desired position, very few closures are subject to rejection, and as a result, a substantially continuous supply of oriented closures on the relatively slowly moving carrier disk 16 are deposited into the feed chute 68 to maintain an adequate supply therein to be withdrawn from the chute at a relatively fast rate.

Referring now to FIGS. 1 and 2, provison is made for detecting the height of the line of closures in the feed chute and for automatically rejecting the closures on the carrier approaching the mouth of the chute in response to the detecting means when the chute is filled to a predetermined height whereby to prevent additional closures from being accumulated at the mouth of the chute while permitting continuous operation of the machine. As herein shown, the closures are arranged to be removed from the disk and rejected into the hopper 130 during the continuous rotation of the disk by an air jet 182 secured to the rail 82 and arranged to release compressed air under the rail through an opening therein in an outward direction across the path of the oncoming closures adjacent the edge of the disk. The upper end of the jet 182 is provided with an air pipe 184 connected in an air line 186 leading from the air block 174. The detecting means includes a photoelectric unit comprising a light source 188 and a photocell 190 positioned above and below the chute 68, respectively, at a point adjacent the upper end of the chute as shown. An opening is provided in the base plate 154 so that the light beam may pass through the chute to be intercepted by the closures in the chute.

The photoelectric unit is connected in a circuit with a time delay relay 192, as shown in FIG. 13, adjusted so as to permit passage of successive spaced closures through the chute without activating the relay. However, when the chute is filled so that the line of contiguous closures in the chute extend beyond the photoelectric unit the light beam will be cut off for a sufficient period of time to trigger the relay. Also connected in circuit with the relay is a solenoid valve 194 which is disposed in the air line 186 as shown. Thus, in operation, when closures are withdrawn from the chute at a rate commensurate with the supply so that the chute will accept successive closures delivered thereto by the carrier disk, no air will be released from the jet 182. However, when the line of closures extends beyond a predetermined height in the chute, this condition will be detected by the protoelectric unit to energize the solenoid valve 194 so as to permit air to pass to the jet 182 and reject all of the succeeding closures on the disk being carried into the path of the air stream. Conversely, when the chute is again clear of closures at a point below the detecting mechanism, the solenoid valve 194 will be permitted to close to cut off the air to the jet 182.

It will be apparent that the present apparatus may be used with equal advantage for handling conventional closures without tabs. Thus, it will be seen that a tab-free closure with its open end up will be supported on the lands 58 of the serrations to be advanced into the chute 68 in a manner similar to that shown in FIG. 5. Also, it will be seen that a tab-free closure guided to the edge of the disk with its open end down will drop down into the serrations and over the lands to be overbalanced and rejected in a manner similar to that shown in FIG. 7. While the tab-free closures will pass through the tab orienting rails 146, 150 and 159 to be deposited in the chute 68, in practice, such tab orienting rails may be eliminated when handling closures without tabs.

While the preferred embodiment of the invention has been herein illustrated and described, it will be understood that the invention may be embodied in other forms within the scope of the following claims.

Having thus described the invention, what is claimed is:
1. Apparatus for handling hollow closures open at one end comprising, in combination, a rotary carrier disk notched along its peripheral edge to provide spaced lands, and stationary rails disposed above the disk for guiding outwardly randomly arranged closures placed on the disk to a position wherein a portion of each closure extends beyond the edge of the disk, those closures assuming an open end up position being supported between adjacent lands to maintain their balance on the disk, and those closures assuming an open end down position dropping over the lands to be overbalanced and rejected from the disk.

2. Apparatus for handling hollow closures open at one end comprising, in combination, a rotary carrier disk notched along its peripheral edge to provide spaced lands and a stationary spiral shaped guide rail supported above the rotary carrier for guiding outwardly randomly arranged closures placed on the disk to a position wherein a portion of each closure overhangs the edge of the disk, those closures assuming an open end up position being supported by adjacent lands to maintain their balance as they are moved along said edge, and those closures assuming an open end down position dropping over the lands to be overbalanced and rejected from the disk.

3. Apparatus for handling hollow closures open at one end comprising, in combination, a rotary carrier disk notched along its peripheral edge to provide spaced lands, and a spiral shaped rail supported above the carrier disk for guiding outwardly randomly arranged closures placed on the disk to a position wherein a portion of each closure extends beyond the edge of the disk, said carrier disk being dish shaped to provide an annular upwardly inclined surface up which the closures are moved by the rail during rotation of the disk, those closures assuming an open end up position being supported by adjacent lands to maintain their balance as they are moved along said edge, and those closures assuming an open end down position dropping over the lands to be overbalanced and rejected from the disk.

4. Apparatus for handling hollow closures open at one end comprising, in combination, a rotary carrier disk notched along its peripheral edge to provide spaced lands, a spiral shaped rail supported above the carrier disk for guiding outwardly randomly arranged closures placed on the disk to a position wherein a portion of each closure extends beyond the edge of the disk, said carrier disk being shaped to provide an annular upwardly inclined surface up which the closures are moved by the rail during rotation of the disk, those closures assuming an open end up position being supported by adjacent lands to maintain their balance as they are moved along said edge, and those closures assuming an open end down position dropping over the lands to be overbalanced and rejected from the disk, said randomly arranged closures being deposited between the convolutions of the spiral shaped rail at various distances from the center of the carrier disk, said closures successively engaging the rail at progressively greater distances from the center to cause the closures to assume a position of alignment one behind the other in a single line.

5. Apparatus for handling hollow closures open at one end comprising, in combination, a rotary carrier disk notched along its peripheral edge to provide spaced lands, means for depositing randomly arranged closures onto said disk, a spiral shaped rail supported above the carrier disk and coopeatirng therewith for guiding outwardly said randomly arranged closures to a position wherein a portion of each closure overhangs the edge of the disk, those closures assuming an open end up position being supported between adjacent lands to maintain their balance on the disk, and those closures assuming an open end down position dropping over the lands to be overbalanced and rejected from the disk, and a feed chute supported adjacent the edge of the disk and into which successive open end up closures are deposited during continued rotation of the disk.

6. A closure handling apparatus as defined in claim 5 wherein the disk is dish shaped to provide an annular upwardly inclined surface up which the closures are guided by the rail during rotation of the disk.

7. Closure handling apparatus as defined in claim 5 wherein the spiral rail terminates at a point preceding said feed chute, and means for moving the overhanging closures inwardly from the edge after they pass beyond said terminating point.

8. Closure handling apparatus as defined in claim 5 wherein the spiral rail terminates at a point preceding said feed chute, an air jet directing a stream of air against successive closures for moving the overhanging closures inwardly from the edge after they pass beyond said terminating point, and means for guiding the closures into said feed chute.

9. Apparatus for handling hollow closures open at one end and provided with a laterally extended opening tab comprising, in combination, a rotary carrier disk notched along its peripheral edge to provide spaced lands, a stationary spiral shaped rail supported above the disk and cooperating therewith for guiding outwardly randomly arranged closures deposited on the disk to a position wherein portions of successive closures extend beyond the edge of the disk, those closures assuming an open end up position being supported between adjacent lands to maintain their balance on the disk, and those closures assuming an open end down position dropping over the lands to be overbalanced and rejected from the disk, said closures being caused to rotate by frictional engagement with the stationary guide rail as they are carried around on the disk to present the tabs in a direction inwardly of the edge of the disk whereby to reduce to a minimum the influence of the weight of the tabs when the closures are moved to a balanced position beyond the edge of the disk.

10. Apparatus for handling hollow closures open at one end and provided with a laterally extended opening tab comprising, in combination, a rotary carrier disk notched along its peripheral edge to provide spaced lands, a stationary spiral shaped rail supported above the disk and cooperating therewith for guiding outwardly randomly arranged closures deposited on the disk to a position wherein portions of successive closures extend beyond the edge of the disk, those closures assuming an open end up position being supported between adjacent lands to maintain their balance on the disk, and those closures assuming an open end down position dropping over the lands to be overbalanced and rejected from the disk, a feed chute supported adjacent the carrier disk and into which successive open end up closures are deposited, means for moving the balanced closures inwardly from the edge to be guided into said chute, and means for orienting the closures to present the same with their tabs extended rearwardly prior to entering said chute.

11. Closure handling apparatus as defined in claim 10 wherein the feed chute is arranged to guide the tab closures in their oriented position with the tabs extending rearwardly, succeeding closures sliding under the tabs of the preceding closures to present the body portions of the closures in contiguous engagement.

12. Closure handling apparatus as defined in claim 10 wherein the tab portion is offset from the rim of the closure and the tab orienting means includes a guide rail arranged diagonally in the path of the closures at a height such as to permit passage of the body portion thereunder, said rail guiding the tab portion into an outwardly extended position, and an outer rail having an upright edge against which the tab is guided to present it into a rearwardly extended position during its advance into the mouth of the chute.

13. Apparatus for handling hollow closures open at one end having a body portion and provided with a laterally extended opening tab offset from the body portion comprising, in combination, a rotary carrier disk notched along its periphery to provide spaced lands, a spiral rail supported above the disk and cooperating therewith for guiding outwardly randomly arranged closures deposited on the disk to a position wherein portions of successive closures extend beyond the edge of the disk, those closures assuming an oriented open end up position being supported between adjacent lands to maintain their balance on the disk, and those closures assuming an open end down position dropping over the lands to be overbalanced and rejected from the disk, a feed chute cooperating with the carrier disk and into which successive open end up closures are deposited, means for orienting the tab portions to extend rearwardly prior to entering the chute comprising a guide rail arranged diagonally in the path of the closures at a height such as to permit passage of the body portion of oriented closures thereunder and to guide the offset tab portion outwardly, an outer rail having an upright edge against which the tab is guided to turn it into a rearwardly extended position, and an air jet directing a stream of air against successive closures after they have passed under said rail for rapidly advancing successive closures into the mouth of the chute and to effect separation of contiguous closures.

14. Apparatus for handling hollow closures open at one end having a body portion and provided with a laterally extended opening tab offset from the body portion comprising, in combination, a rotary carrier disk notched along its periphery to provide spaced lands, a spiral rail supported above the disk and cooperating therewith for guiding outwardly randomly arranged closures deposited on the disk to a position wherein portions of successive closures extend beyond the edge of the disk, those closures assuming an oriented open end up position being supported between adjacent lands to maintain their balance on the disk, and those closures assuming an open end down position dropping over the lands to be overbalanced and rejected from the disk, a feed chute cooperating with the carrier disk and into which successive open end up closures are deposited, means for orienting the tab portions to extend reardwardly prior to entering the chute comprising a guide rail arranged diagonally in the path of the closures at a height such as to permit passage of the body portion of oriented closures thereunder and to guide the offset tab portion outwardly, an outer rail having an upright edge against which the tab is guided to turn it into a rearwardly extended position, and means for rejecting those closures arriving at the diagonal rail in other than an oriented position which fail to pass under the rail and which will be guided outwardly by the rail toward the edge of the disk, said rejecting means including means on said outer rail for lifting the non-oriented closures to a position above the oriented closures, and an air jet arranged to direct a stream of air at a height above said oriented closures and to strike against a closure lifted by said outer rail to reject the same.

15. Closure handling apparatus as defined in claim 14 wherein the non-oriented closures rejected by said air jet include an open end down closure assuming a balanced position across adjacent lands, and closures which are arranged in nested relation one above the other.

16. Apparatus for handling hollow closures open at one end and provided with a laterally extended opening tab comprising, in combination, a rotary carrier disk notched along its peripheral edge to provide spaced lands, a spiral shaped rail supported above the carrier disk and cooperating therewith for guiding outwardly and in a single line randomly arranged closures deposited on the disk to a position wherein portions of successive closures extend beyond the edge of the disk, said carrier disk being dish shaped to provide an annular upwardly inclined surface up which the closures are moved by the rail during rotation of the disk, those closures assuming an oriented open end up position being supported between adjacent lands to maintain their balance on the disk, and those closures assuming an open end down position dropping over the lands to be overbalanced and rejected from the disk, a feed chute supported adjacent the edge of the disk and into which successive open end up closures are deposited during continued rotation of the disk, and means for orienting the tab portions of the closures to extend the same rearwardly prior to the closures entering the mouth of the chute.

17. Apparatus for handling closures open at one end and provided with a laterally extended tab comprising, in combination, a rotary carrier disk notched along its peripheral edge to provide spaced lands, a spiral shaped rail supported above the carrier disk and cooperating therewith for guiding outwardly and in a single line randomly arranged closures to a position wherein a portion of each closure overhangs the edge of the disk, those closures assuming an open end up oriented position being supported between adjacent lands to maintain their balance on the disk, and those closures assuming an open end down position dropping over the lands to be overbalanced and rejected from the disk, means disposed along the edge of the disk for rejecting those closures riding one on top of the other, and a feed chute cooperating with the disk and into which successive open end up closures are deposited during continued rotation of the disk, said last named rejecting means comprising a rail extending diagonally across the path of the closures adjacent the edge of the disk at a height such as to permit passage of a single tab closure under the rail and to guide outwardly those closures riding one on top of the other to reject the same.

18. Apparatus for handling hollow closures open at one end comprising, in combination, a continuously rotated carrier disk notched along its periphery to provide spaced lands, a spiral rail disposed above the disk for guiding outwardly randomly arranged closures placed on the disk to a position wherein a portion of each closure extends beyond the edge of the disk, those closures assuming an oriented open end up position being supported between adjacent lands to maintain their balance on the disk, and those closures assuming an open end down position dropping over the lands to be overbalanced and rejected from the disk, a feed chute cooperating with the disk and into which successive open end up closures are deposited to provide a supply thereof and from which oriented closures may be withdrawn, and control means including means for detecting the height of a line of closures at a predetermined point in the chute, and means responsive to said detecting means for rejecting from the disk succeeding closures approaching the mouth of the chute while permitting continuous rotation of the carrier disk.

19. Apparatus as defined in claim 18 wherein the detecting means comprises a photoelectric unit, and wherein the rejecting means comprises an air jet arranged to blow the closures off the edge of the disk.

20. Apparatus as defined in claim 18 wherein the control means includes a photoelectric unit in circuit with a solenoid valve, and an air jet connected to a source of compressed air controlled by said valve.

References Cited by the Examiner

UNITED STATES PATENTS

| 1,623,066 | 4/1927 | Nordstrom. |
| 2,715,978 | 8/1955 | Sterling. |
| 2,964,182 | 12/1960 | Spurlin _____ 209—83 X |
| 3,033,418 | 5/1962 | Hollopetre. |
| 3,065,841 | 11/1962 | Stover _____ 198—33 X |
| 3,115,234 | 12/1963 | Eleftherion et al. _____ 198—33 |
| 3,131,802 | 5/1964 | Mirvis _____ 198—33 |
| 3,150,762 | 9/1964 | Tricinci _____ 198—33 |

FOREIGN PATENTS

| 1,011,471 | 4/1952 | France. |
| 1,001,322 | 8/1965 | Great Britain. |

M. HENSON WOOD, JR., *Primary Examiner.*

J. N. ERLICH, *Assistant Examiner.*